United States Patent
Miller et al.

(10) Patent No.: US 9,854,497 B2
(45) Date of Patent: Dec. 26, 2017

(54) METHOD AND APPARATUS FOR SELF CONFIGURATION OF LTE E-NODE BS

(71) Applicant: InterDigital Technology Corporation, Wilmington, DE (US)

(72) Inventors: James M. Miller, Verona, NJ (US); Ulises Olvera-Hernandez, London (GB); Peter S. Wang, E. Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 15/429,959

(22) Filed: Feb. 10, 2017

(65) Prior Publication Data

US 2017/0156098 A1 Jun. 1, 2017

Related U.S. Application Data

(63) Continuation of application No. 15/068,991, filed on Mar. 14, 2016, which is a continuation of application No. 14/601,332, filed on Jan. 21, 2015, now Pat. No. 9,320,066, which is a continuation of application No. 11/875,693, filed on Oct. 19, 2007, now Pat. No. 8,977,839.

(Continued)

(51) Int. Cl.

| | |
|---|---|
| *H04W 76/02* | (2009.01) |
| *H04W 36/30* | (2009.01) |
| *H04W 72/04* | (2009.01) |
| *H04W 12/06* | (2009.01) |
| *H04W 4/02* | (2009.01) |
| *H04L 29/06* | (2006.01) |

(52) U.S. Cl.
CPC ........... *H04W 36/30* (2013.01); *H04W 4/025* (2013.01); *H04W 12/06* (2013.01); *H04W 72/0406* (2013.01); *H04W 76/021* (2013.01)

(58) Field of Classification Search
None
See application file for complete search history.

(56) References Cited

U.S. PATENT DOCUMENTS 5,159,596 A * 10/1992 Itoh ...................... H04B 7/2643
370/329
5,613,211 A * 3/1997 Matsuno .............. H04B 7/2668
370/350

(Continued)

FOREIGN PATENT DOCUMENTS

| EP | 1365609 | 11/2003 |
|---|---|---|
| GB | 2392799 | 3/2004 |

(Continued)

OTHER PUBLICATIONS

U.S. Pat. No. 8,977,839, granted on Mar. 10, 2015.

(Continued)

*Primary Examiner* — Michael R Vaughan
(74) *Attorney, Agent, or Firm* — Eric Berkowitz

(57) ABSTRACT

The present invention is a procedure for a self configuring eNB/E-UTRAN. The eNB/E-UTRAN interacts with the Enhanced Packet Core (EPC) of the LTE network in order to complete the mutual authentication task between the eNB and the EPC and other operating procedures in the eNB self configuration phase.

18 Claims, 8 Drawing Sheets

Related U.S. Application Data

(60) Provisional application No. 60/862,341, filed on Oct. 20, 2006.

(56) References Cited

U.S. PATENT DOCUMENTS

| | | | | |
|---|---|---|---|---|
| 6,034,950 | A * | 3/2000 | Sauer | H04Q 11/0478 370/310.2 |
| 6,041,228 | A * | 3/2000 | Niska | H04W 24/02 455/419 |
| 6,081,229 | A * | 6/2000 | Soliman | G01S 5/0054 342/357.42 |
| 7,024,688 | B1 * | 4/2006 | Faccin | H04L 29/06027 380/247 |
| 7,035,637 | B2 | 4/2006 | Motegi et al. | |
| 7,099,694 | B1 * | 8/2006 | Aramaki | H04L 29/12254 370/313 |
| 7,336,954 | B2 | 2/2008 | Wang et al. | |
| RE40,966 | E * | 11/2009 | Niska | H04W 24/02 455/418 |
| 7,680,073 | B2 | 3/2010 | Jamieson et al. | |
| 7,681,031 | B2 * | 3/2010 | Matusz | H04W 12/06 713/151 |
| 7,751,833 | B2 * | 7/2010 | Mansour | H04W 24/02 342/357.22 |
| 8,024,000 | B2 * | 9/2011 | Wang | H04W 8/20 455/411 |
| 8,364,119 | B2 * | 1/2013 | Reudink | H04W 16/10 379/133 |
| 8,498,616 | B2 * | 7/2013 | Voyer | H04L 63/0823 455/411 |
| 8,705,501 | B2 | 4/2014 | Gupta et al. | |
| 2002/0123365 | A1 * | 9/2002 | Thorson | H04W 88/08 455/524 |
| 2002/0151300 | A1 * | 10/2002 | Suda | H04W 84/045 455/422.1 |
| 2002/0151308 | A1 * | 10/2002 | Baba | H04W 24/02 455/446 |
| 2002/0152378 | A1 * | 10/2002 | Wallace, Jr. | H04L 63/0428 713/168 |
| 2002/0193116 | A1 * | 12/2002 | Agrawal | H04L 29/12018 455/445 |
| 2003/0058818 | A1 * | 3/2003 | Wilkes | H04W 36/0055 370/331 |
| 2003/0076803 | A1 * | 4/2003 | Chuah | H04W 36/10 370/338 |
| 2003/0109254 | A1 * | 6/2003 | Motegi | H04W 24/02 455/435.1 |
| 2003/0119481 | A1 * | 6/2003 | Haverinen | H04W 8/26 455/411 |
| 2003/0200433 | A1 * | 10/2003 | Stirbu | H04L 9/0844 713/169 |
| 2005/0026597 | A1 * | 2/2005 | Kim | H04W 48/12 455/412.1 |
| 2005/0041638 | A1 * | 2/2005 | Peng | H04L 29/12235 370/352 |
| 2005/0107095 | A1 * | 5/2005 | Samuel | H04W 24/00 455/456.5 |
| 2005/0117543 | A1 * | 6/2005 | Heath | H04L 1/0025 370/329 |
| 2005/0148368 | A1 * | 7/2005 | Scheinert | H04W 24/02 455/561 |
| 2005/0239484 | A1 * | 10/2005 | Park | H04W 88/181 455/466 |
| 2006/0014541 | A1 * | 1/2006 | Kato | H04W 16/00 455/446 |
| 2006/0035661 | A1 * | 2/2006 | Niwano | H04W 36/16 455/522 |
| 2006/0123021 | A1 * | 6/2006 | Byers | H05K 7/1459 |
| 2007/0047451 | A1 * | 3/2007 | Lohr | H04L 1/1887 370/242 |
| 2007/0105549 | A1 * | 5/2007 | Suda | H04W 28/16 455/426.2 |
| 2007/0173259 | A1 * | 7/2007 | Akihara | H04W 24/02 455/446 |
| 2007/0186108 | A1 * | 8/2007 | Passarella | H04L 61/2015 713/171 |
| 2007/0281708 | A1 * | 12/2007 | Bakhuizen | H04W 28/08 455/450 |
| 2007/0291674 | A1 * | 12/2007 | Cheng | H04L 12/189 370/312 |
| 2007/0291770 | A1 * | 12/2007 | Kitazoe | H04J 11/0093 370/395.52 |
| 2007/0297367 | A1 * | 12/2007 | Wang | H04L 63/0414 370/331 |
| 2008/0080399 | A1 * | 4/2008 | Wang | H04W 24/02 370/254 |
| 2008/0102794 | A1 * | 5/2008 | Keevill | H04L 12/5692 455/411 |
| 2008/0141094 | A1 * | 6/2008 | Vayanos | H03M 13/2707 714/751 |
| 2008/0167003 | A1 * | 7/2008 | Wang | H04W 8/20 455/411 |
| 2008/0225797 | A1 * | 9/2008 | Kim | H04W 36/0083 370/331 |
| 2008/0318586 | A1 * | 12/2008 | Niwano | H04W 36/16 455/450 |
| 2009/0016254 | A1 * | 1/2009 | Lee | H04W 72/005 370/312 |
| 2009/0021572 | A1 * | 1/2009 | Garudadri | H04L 47/10 348/14.01 |
| 2009/0059835 | A1 * | 3/2009 | Motegi | H04L 12/185 370/312 |
| 2009/0247163 | A1 * | 10/2009 | Aoyama | H04W 48/10 455/436 |
| 2009/0285144 | A1 * | 11/2009 | Motegi | H04W 72/005 370/312 |
| 2009/0290509 | A1 * | 11/2009 | Vujcic | H04L 12/5695 370/254 |
| 2009/0292509 | A1 * | 11/2009 | Thompson | G06F 17/5004 703/1 |
| 2010/0167746 | A1 * | 7/2010 | Lee | H04W 48/12 455/450 |
| 2010/0235634 | A1 * | 9/2010 | Fischer | H04L 63/0457 713/168 |

FOREIGN PATENT DOCUMENTS

| | | |
|---|---|---|
| JP | 07-193859 | 7/1995 |
| JP | 2000-354048 | 12/2000 |
| JP | 2003-249944 | 9/2003 |
| JP | 2003-274011 | 9/2003 |
| JP | 2006-060850 | 3/2006 |
| KR | 10-2006-0063618 A | 6/2006 |
| RU | 2005 107 331 A | 8/2005 |
| TW | 200400720 | 1/2004 |
| TW | 580837 | 3/2004 |
| WO | WO-96/14720 | 5/1996 |
| WO | WO-00/69199 | 11/2000 |
| WO | WO-00/77981 | 12/2000 |
| WO | WO-03/049486 | 6/2003 |
| WO | WO-2005/051024 | 6/2005 |
| WO | WO-2005/125249 | 12/2005 |
| WO | WO-2006/010953 | 2/2006 |
| WO | WO-2006/025654 | 3/2006 |

OTHER PUBLICATIONS

U.S. Pat. No. 9,320,066, granted on Apr. 19, 2016.

U.S. Appl. No. 15/068,991, filed Mar. 14, 2016.

"3rd Generation Partnership Project; Technical Specification Group Radio Access Network; Evolved Universal Terrestrial Radio Access (E-UTRA) and Evolved Universal Terrestrial Radio Access Network (E-UTRAN), Overall Description; Stage 2 (Release 8)", 3GPP TS 36.300 V0.3.1, Nov. 2006, 64 pages.

"3rd Generation Partnership Project; Technical Specification Group Radio Access Network; Evolved Universal Terrestrial Radio Access (E-UTRA) and Evolved Universal Terrestrial Radio Access Net-

(56) References Cited

OTHER PUBLICATIONS work (E-UTRAN); Overall Description; Stage 2 (Release 8)", 3GPP TS 36.300 V8.2.0, Sep. 2007, 109 pages.
"3rd Generation Partnership Project; Technical Specification Group Radio Access Network; 51 Application Protocol (S1AP) (Release 8)", 3GPP TS 36.413 V8.0.0, Dec. 2007, 125 pages.
"3rd Generation Partnership Project; Technical Specification Group Radio Access Network; X2 Application Protocol (X2AP) (Release 8)", 3GPP TS 36.423 V8.0.0, Dec. 2007, 60 pages.
"3rd Generation Partnership Project; Technical Specification Group Services and System Aspects; 3G Security; Security Architecture (Release 5)", 3GPP TS 33.102 V5.7.0, Dec. 2005, 61 pages.
"3rd Generation Partnership Project; Technical Specification Group Services and System Aspects; 3G Security; Security Architecture (Release 5)", 3GPP TS 33.102 V5.5.0, Sep. 2004, 61 pages.
"3rd Generation Partnership Project; Technical Specification Group Services and System Aspects; 3G Security; Security Architecture (Release 6)", 3GPP TS 33.102 V6.5.0, Dec. 2005, 63 pages.
"3rd Generation Partnership Project; Technical Specification Group Services and System Aspects; 3G Security; Security Architecture (Release 7)", 3GPP TS 33.102 V7.1.0, Dec. 2006, 64 pages.
"3rd Generation Partnership Project; Technical Specification; Evolved Universal Terrestrial Radio Access (E-UTRA) and Evolved Universal Terrestrial Radio Access network (E-UTRAN); Overall Description; Stage 2", 3GPP TS 36.300 V0.1.0, Oct. 2006, 55 pages.
"Clarification of functions for self-optimization and self-configuration", 3GPP TSG RAN WG3#53bis, R3-061509, Oct. 10-13, 2006, Oct 10, 2006, 3 pages.
"Diffie-Hellman key exchange", Wikipedia, The Free Encyclopedia http://en.wikipedia.org/w/index.php?title=diffie-hellman_key_exchange&oldid=178082936, Nov. 14, 2007, 6 Pages.
"EUTRAN Architecture Description for 25.912", 3GPP TSG RAN WG3 Meeting #52, R3-060732, May 8-12, 2006, Shanghai, China, May 2006, 4 pages.
"Extended European Search Report", EP Application No. 11191661.5-2221; datedMay 7, 2012, 7 pages.
"IPsec", Wikipedia, The Free Encyclopedia http://en.wikipedia.org/w/index.php?title=IPsec&okdid=178971633, Nov. 14, 2007, 6 Pages.
"Japanese Official Notice of Rejection", Japanese Patent Application No. 2009-544096, dated Jan. 17, 2012, 3 pages.
"Japanese Official Notice of Rejection (Translation)", Japanese Patent Application No. 2009-544096, dated Jan. 17, 2012, 3 pages.
"Korean Notice of Allowance of Patent", Korean Application No. 10-2009-7015773; dated Feb. 18, 2013, 3 Pages.
"Office Action", Taiwanese Patent Application No. 096139408, 10 pages.
"Office Action (Translation)", Taiwanese Patent Application No. 096139408, 8 pages.
"Official Notice of Rejection", Japanese Patent Application No. 2009-544096; dated May 18, 2012, 3 pages.
"Official Notice of Rejection (Translation)", Japanese Patent Application No. 2009-544096; dated May 18, 2012, 4 pages.
"Russian Decision on Grant", Russian Application No. 2009128694/09, dated Jul. 20, 2011, 7 Pages.
"Russian Official Action", Russian Application No. 22009128694/09; dated Aug. 27, 2010, 6 Pages.

"Self-Configuration and Self-Optimisation, Problem Statement and Definition", 3GPP TSG-RAN WG3#53bis, R3-061487, Oct. 10-13, 2006, Seoul, South Korea, Oct. 2006, 7 pages.
"Standardisation policy for plug and play RAN", 3GPP TSG RAN WG3#53, R3-061071, Aug. 28-Sep. 1, 2006, Tallinn, Estonia, Sep. 2006, 4 pages.
"Support for self-configuration and self-optimisation Proposal for Stage2", 3GPP TSG-RAN WG2#54, R2-062411, Aug. 28-Sep. 1, 2006, Tallinn, Estonia, Sep. 2006, 3 pages.
"Taiwan Office Action", Taiwan Application No. 096139408, dated May 31, 2013, 10 Pages.
"Taiwan Office Action (Translation)", Taiwan Application No. 096139408, dated May 31, 2013, 7 Pages.
"Technical Specification Group Services and System Aspects; 3GPP System Architecture Evolution: Report on Technical Options and Conclusions", 3GPP TR 23.882 V1.11.0 (Jul. 2007), Jul. 2007, 211 pages.
"Technical Specification Group services and System Aspects; 3GPP System Architecture Evolution: Report on Technical Options and Conclusions", 3GPP TR 23.882 V1.4.2 (Oct. 2006), Oct. 2006, 160 pages.
"Tolkovy Solvar po Vychislitelnoi Tekhnike", The Explanatory Dictionary of Computing, Moscow Publishing Department "Russkaya Redaktsia", 1995, 2 Pages.
"United States Non-Final Office Action", U.S. Appl. No. 11/964,596, dated Jun. 23, 2010, 17 pages.
"United States Non-Final Rejection", U.S. Appl. No. 11/875,693, dated Oct. 25, 2012, 12 pages.
"United States Notice of Allowance", U.S. Appl. No. 14/601,332, dated Dec. 18, 2015, 10 pages.
"United States Office Action", U.S. Appl. No. 15/068,991, dated Jul. 15, 2016, 13 Pages.
"United States Office Action", U.S. Appl. No. 11/875,693, dated Sep. 25, 2013, 14 pages.
"United States Office Action", U.S. Appl. No. 14/601,332, dated Sep. 1, 2015, 18 pages.
Ericsson, "IP Multi-cast Signalling for Application Protocols", 3GPP TSG-RAN WG3 # 54, Riga, Latvia, Tdoc R3-061778, Nov. 6-10, 2006, 7 pages.
Ericsson, "Text Proposal on PDCP sublayer for TR 25.813, Section 5.3.3", 3GPP TSG RAN WG2x Meeting #53, Shanghai, China, Tdoc R2-061716, May 8-12, 2006, 2 pages.
Kaufman, C., "Internet Key Exchange (IKEv2) Protocol", RFC 4306, Dec. 2005, 83 pages.
Kent, S., "Security Architecture for the Internet Protocol", RFC 4301, Dec. 2005, 85 pages.
Mao, Wenbo, "Modern Cryptography: Theory and Practice", Prentice Hall, 2003; p. 250-251, 2003, 2 Pages.
Nokia, "Discussion of Threats against eNB and Last-Mile in Long Term Evolved RAN/3GPP System Architecture Evolution", 3GPP TSG-SA WG3 Security—S3#42, Bangalore, India, S3060034, Feb. 6-9, 2006, 4 pages.
Nokia, Siemens, Ericsson, Vodafone, Huawei, et al., "Updated Version of 'Rationale and Track of Security Decisions in Long Term Evolved RAN/3GPP System Architecture Evolution'", 3GPP TSG SA WG3 (Security) meeting #45, Ashburn, USA, S3-060706, Oct. 31-Nov. 3, 2006, 45 pages.
Stewart, "Stream Control Transmission Protocol", Network Working Group, Request for Comments: 4960, Sep. 2007, 153 pages.

\* cited by examiner

METHOD AND APPARATUS FOR SELF CONFIGURATION OF LTE E-NODE BS

CROSS REFERENCE TO RELATED APPLICATIONS

This application is a continuation of U.S. application Ser. No. 15/068,991, filed on Mar. 14, 2016, which is a continuation of U.S. application Ser. No. 14/601,332, filed on Jan. 21, 2015, now U.S. Pat. No. 9,320,066, which is a continuation of U.S. application Ser. No. 11/875,693, filed on Oct. 19, 2007, now U.S. Pat. No. 8,977,839, which claims the benefit of U.S. provisional Application No. 60/862,341, filed on Oct. 20, 2006, the contents of each are incorporated by reference herein as if fully set forth.

FIELD OF INVENTION

The present invention relates to wireless communication systems.

BACKGROUND

The Third Generation Partnership Project (3GPP) has initiated the Long Term Evolution (LTE) program to bring new technology, new network architecture, new configurations, and new applications and services to wireless cellular networks in order to provide improved spectral efficiency and faster user experiences. LTE also requires a low maintenance system in terms of network deployment and runtime service optimization. This is the background for the current LTE evolved universal terrestrial radio access network (E-UTRAN) Self Configuration and Self Optimization work effort.

Prior to LTE, the UTRAN architecture of the currently used 3GPP universal mobile telecommunications system (UMTS) is shown in FIG. 1. The radio access network or radio network system (RNS) or the UTRAN 10 comprises one or more radio network controllers (RNC) 11 and one or more Node-Bs 12. The configurations and operations of deployed Node-Bs 12 currently are totally controlled by RNC 11 using explicit commands over Iub link 13. Any configurations and service upgrades of Node-Bs 12 depend on RNC 11 and other cell engineering and planning efforts. Currently, there is no ability or requirements that exist for self configuration and optimization of Node Bs by the Node B.

Accordingly, a method and apparatus for self configuring LTE evolved Node-Bs (eNBs) are desired.

SUMMARY

A method and apparatus are disclosed for a self configuring eNB/UTRAN. The eNB/E-UTRAN interacts with the Evolved Packet Core (EPC) of the Long Term Evolution (LTE) network in order to complete the mutual authentication task between the eNB and the EPC, and other operating procedures in the eNB self configuration phase.

DETAILED DESCRIPTION

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Figure 1:
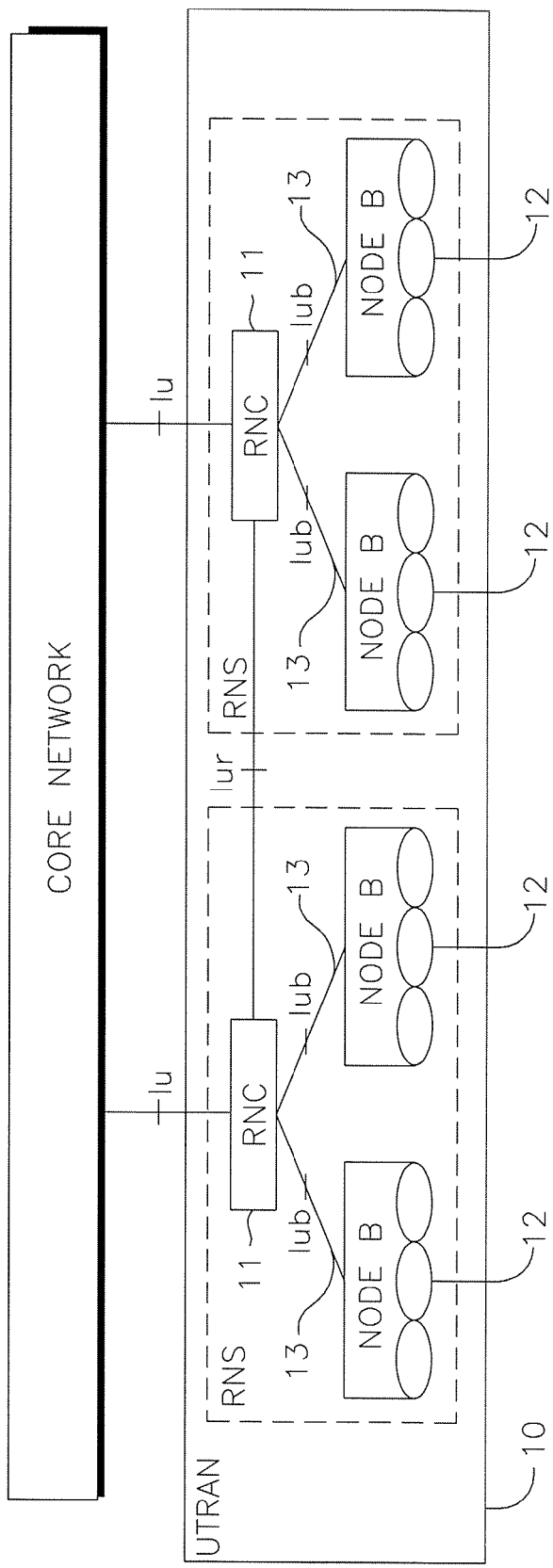
FIG. 1 is a block diagram of the current 3GPP UTRAN architecture.
Figure 2:
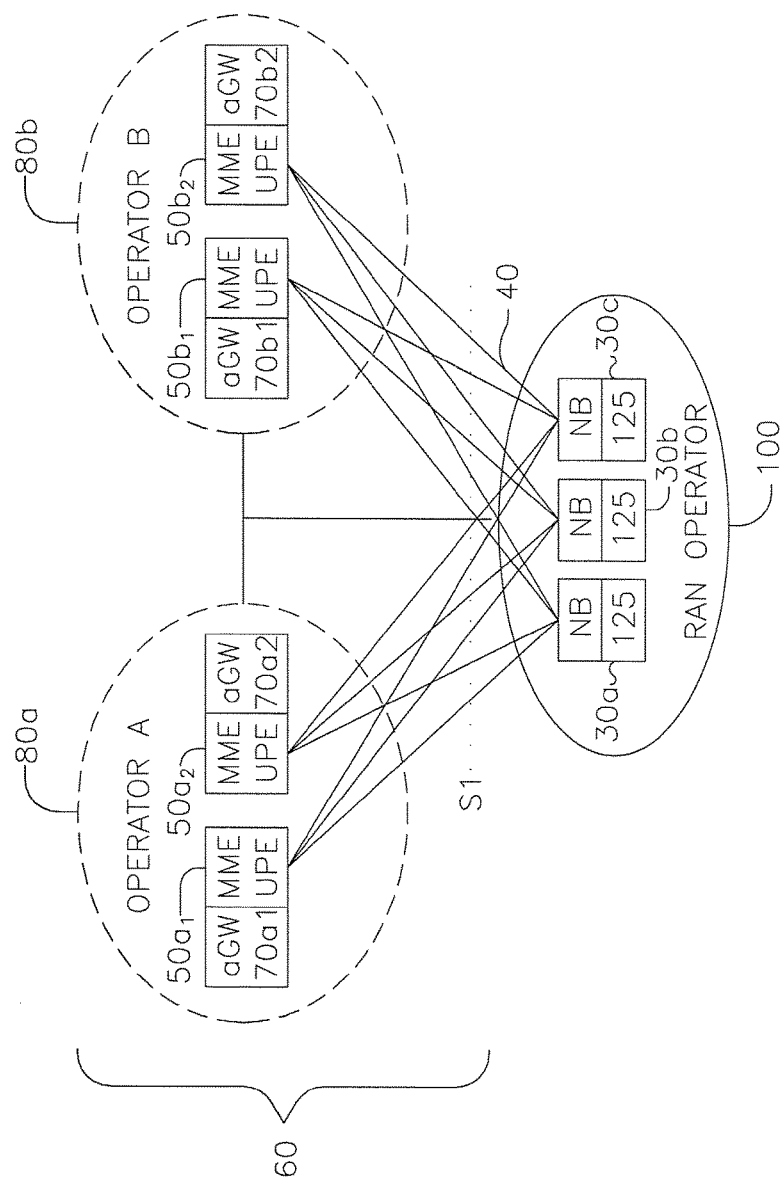
FIG. 2 is a block diagram of an example Long Term Evolution (LTE) E-UTRAN network sharing architecture.

An eNB is disclosed that is linked directly with the EPC and among other eNBs and performs the radio access network functionality for E-UTRAN. An example LTE system 20 including the disclosed self configuring eNB is illustrated in FIG. 2. LTE system 20 comprises an EPC network 80 and a radio access network (RAN) operator 100. RAN operator 100 comprises one or more eNBs 30 (i.e., 30a, 30b and 30c).

Figure 3:
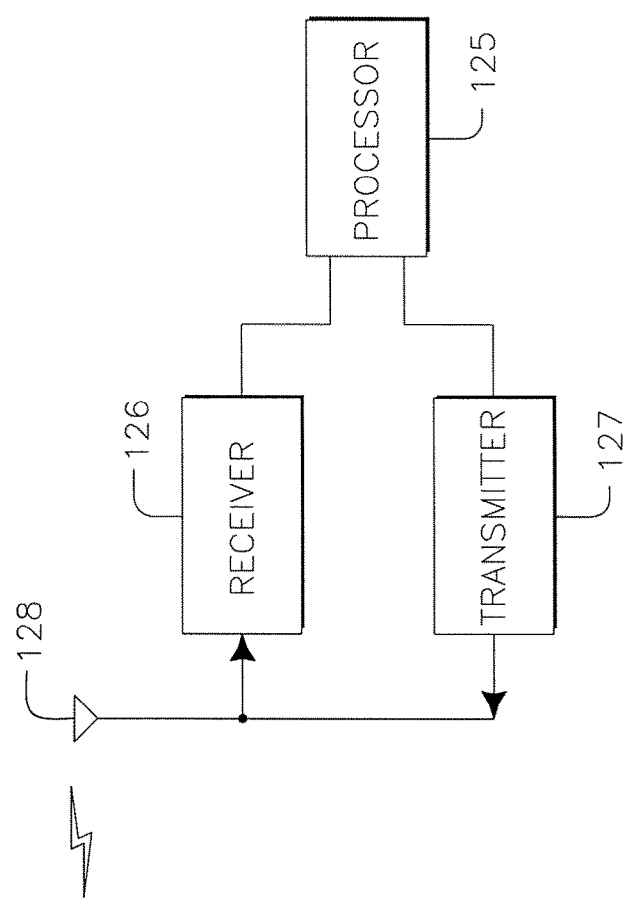
FIG. 3 is a block diagram of an example eNB.

FIG. 3 is an example of a functional block diagram of an eNB 30. In addition to components included in a typical transceiver, eNB 30 includes a processor 125, configured to perform self configuration, as disclosed below. The eNB further includes a receiver 126 in communication with the processor 125, a transmitter 127 in communication with the processor 125, and an antenna 128 in communication with the receiver 126 and the transmitter 127 to facilitate the transmission and reception of wireless data.

Referring back to FIG. 2, EPC 60 coupled to the one or more eNBs 30 through S1 link 40, comprises one or more mobility management entities/User Plane Entities (MME UPEs) 50 and an access gateway (aGW) 70. As those having skill in the art know, S1 link 40 provides support for load sharing of traffic across network elements in EPC 60, MME UPEs 50 and aGWs 70, by creating pools of MME UPEs 50 and aGWs 70 and allowing each eNB 30 to be connected to multiple MME UPEs 50 and aGWs 70 in a pool. MME UPE 50, coupled to aGW 70, assists EPC 60 in choosing a serving aGW for eNB 30. Also coupled to MME UPE 50 is eNB 30 through S1 link 40.

In accordance with the present teaching, eNBs 30 assume the radio access network (RAN) configuration, operation and management control functions as well as the radio interface configurations and operations. The eNBs further interact directly with EPC 60, as well as, with neighboring eNBs 30 or other network nodes to directly handle WTRU Mobility management tasks.

Disclosed self configuring eNB 30 is coupled to one or more aGWs 70 and MME UPEs 50 belonging to different network operator/service providers 80, either physically or logically. In the disclosed method, self configuring eNB 30 performs eNB authentication through the primary operator's serving aGW interface.

Primary network operators 80, Operator 80a and 80b for example, may include more than one aGWs 70a, 70b (e.g., $70a_1$ and $70a_2$, $70b_1$ and $70b_2$, respectively) from an aGW pool currently connecting to eNB 30. Each individual aGW 70a, 70b could potentially serve as the serving aGW for eNB 30. It is the primary operator's responsibility for assigning one of the aGW to act as the serving aGW (towards this eNB) for the eNB upon initial configuration to the EPC 60. eNB 30 is then able to interact with the designated serving aGW in the primary operator's network 80, and through which eNB 30 performs the eNB authentication and E-UTRAN operating parameter acquisition.

For purposes of this disclosure, a primary operator is defined as the network operator or service provider that deploys the eNB in concert with the Public Land Mobile Network Id (PLMN-Id). A serving aGW is defined as the aGW that currently bridges to the network designated entity (such as an O&M or an authentication center (AuC), not shown) and interacts over S1 C-plane of S1 links 40 with the eNB 30 for a specific task, such as eNB self configuration.

Preferably, eNB 30 belongs to the primary (deploying) operator, Operator A 80a in the example illustrated in FIG. 2, and therefore is self configured by its own operator, thereby serving not only the standardized functionalities to the LTE networks, (primary or non-primary operator's networks), but also the deploying operator's specific features or functionalities.

As such, the eNB authentication and E-UTRAN operating parameter acquisition in the eNB self configuration phase are conducted with the primary operator's serving aGW. The acquisition and authentication is performed only once with each eNB 30 power up session. The result of the actions with the primary operator network 80 shall enable eNB 30 to obtain information and policies regarding how to interact with the rest of non-primary operator's networks 80b.

Given the multiplicity of S1 links 40 to an eNB 30, a port/address/interface identity is used by eNB 30 to start the eNB authentication and E-UTRAN parameter acquisition. If the multiplicity is realized physically, (i.e. there are as many physical links/wires connecting to the eNB), each S1 link 40 ending at a different aGW 70, a primary S1 link port, physically connecting the port to the primary operator's network 80 (may also be the primary operator's serving aGW for the eNB) may be used in one disclosed method of eNB authentication. The advantage of this architecture is that it avoids the overhead required when running a node resolution procedure, to be disclosed below. However, this architecture requires the installation be primary-operator-serving-aGW sensitive.

If the IP address (or a fully qualified domain name or URL) of the primary operator's serving aGW (for initialization) is pre-configured to the eNB (maybe together with all other aGWs), then in another disclosed method of eNB authentication self configuring eNB 30 may rely on the underlying IP network to connect the serving aGW given only the destination IP address.

In yet another method of authentication, the eNB parameters may be pre-configured and stored in an universal integrated circuit card (UICC) device, for example, for easy retrieval and update.

In a preferred method of eNB authentication, the multiple S1 links 40 are logically distinctive. As such, a node resolution method is preferably used to aid self configuring eNB 30 in identifying the primary operator's 80a serving aGW and to obtain necessary information regarding the connected aGWs 70.

Upon power up and initialization, an upcoming eNB 30 reads the UICC device for its pre-configured identities, such as the eNB-Id and its deploying operator's identity, the public land mobile network (PLMN)-Id, as well as, certain of its security parameters such as the shared-secret-key among eNBs 30a and aGWs 70 for initial serving aGW resolution. The key shall be configured to eNB 30a with a UICC device or other secure methods. It is preferable that a self protecting UICC provide access with the required identity to operate and also be able to destroy or conceal all data and functions upon illegal access, such as pulling out of the card slot without proper release steps.

Figure 4:
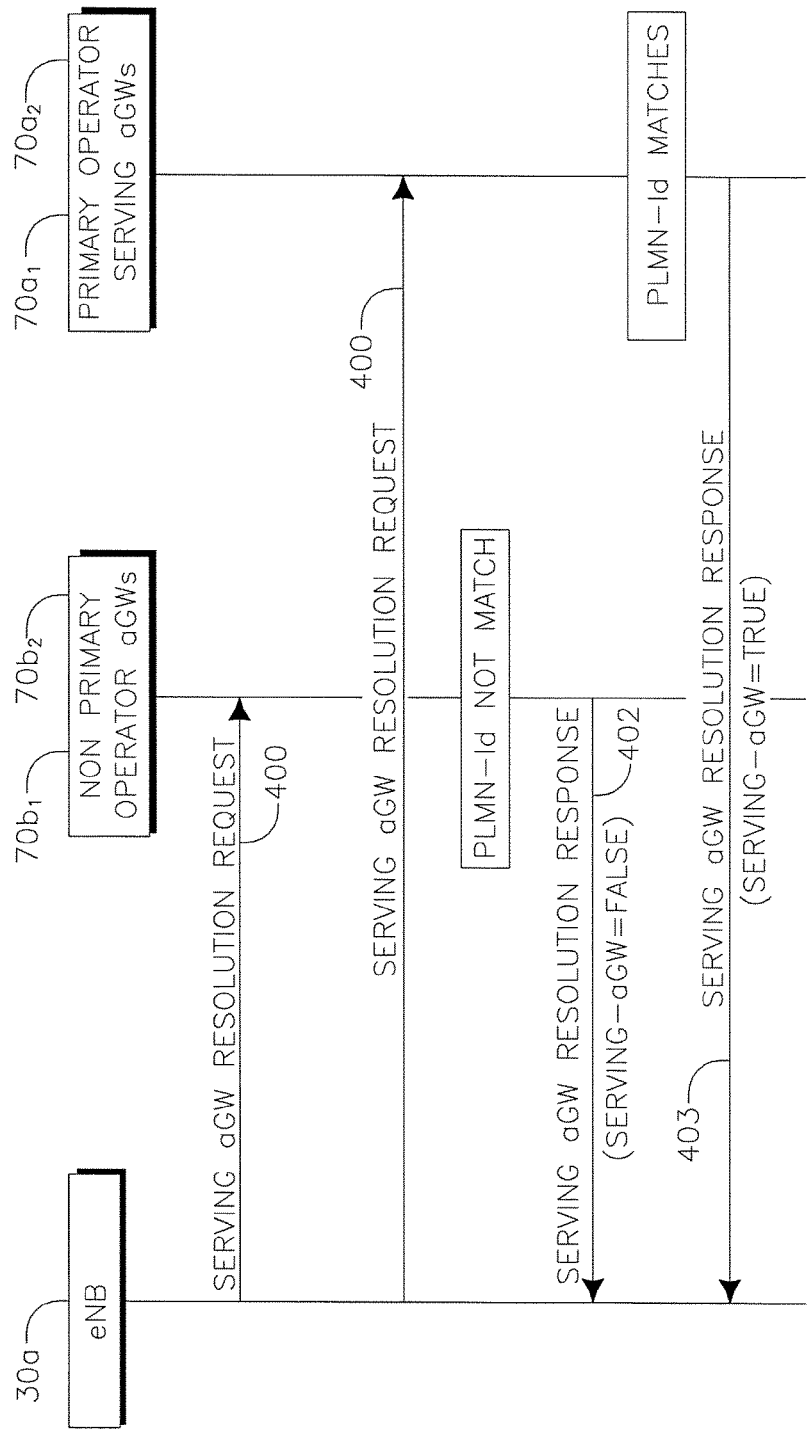
FIG. 4 is an example signal diagram for primary operator serving access gateway (aGW) resolution and IP address acquisition.

FIG. 4 illustrates an example signal diagram of a disclosed eNB method for primary operator serving aGW resolution and IP address requisition. Once eNB 30 has obtained its eNB-ID, PLMN-ID and the like, self configuring eNB 30 broadcasts to all connecting aGW interfaces, or sends to each aGW, $70a_1$, $70a_2$, (Primary Operator 80a) $70b_1$, $70b_2$, (Non-primary Operator 80b) a "Serving aGW Resolution Request" message 400 with encoded (encoding with a shared-secret-key to prevent general identity steal by wire mapping) eNB-Id and PLMN-Id, for example. Other eNB credentials may also be used for encoding the request, including a request type (Req_Type) of one from <Initial deployment, eNB restart, eNB relocation> to identify the respective eNB self configuration scenarios.

Alternatively, an eNB location identity (generated by fresh global positioning system (GPS) measurement of longitude, latitude, and/or altitude and converted to a single eNB-location-Id and normalized) may also be included in the "Serving aGW Resolution Request" message to disclose the geographical location of eNB 30 at initial deployment or at eNB relocation to prevent the possible fraud of eNB impersonation.

Each aGW $70a_1$, $70a_2$, $70b_1$, $70b_2$ that receives the serving aGW Resolution Request then checks to see if the PLMN-Id matches its own PLMN-Id to determine whether it is eNB's 30a primary operator. aGW(s) ($70a_1$, $70a_2$ in this example) with matching PLMN-Id will further check the eNB-Id to determine if it is the serving aGW (among many in the aGW pool) for requesting eNB 30a (up to the service distribution and assignment of the primary operator). The serving aGW will then gather operational information for the eNB. In the example illustrated in FIG. 2, the serving aGW is designated 70a for eNB 30a.

Serving aGW 70a then replies to eNB 30a using a "Serving aGW Resolution Response" signal 403 with the field serving–aGW=TRUE. The reply may also include other identities and other parameters for subsequent procedures and operations.

In an alternative method, all other non-primary operators 80b and non-serving aGWs $70b_1$, $70b_2$ may also learn about the upcoming eNB 30a and reply with a serving aGW Resolution Response 402 with a field serving–aGW=FALSE and its identities such as the aGW-Id and the PLMN-Id, and the like.

As self configuring eNB 30a has received serving aGW's $70a_1$ positive response and its IP address derived, eNB 30a then activates the IPsec security setup with a Security Association and "Internet Key Exchange Protocol" procedures to the underlying IP layer to enable the secure link between eNB 30a and the serving aGW 70.

Figure 5:
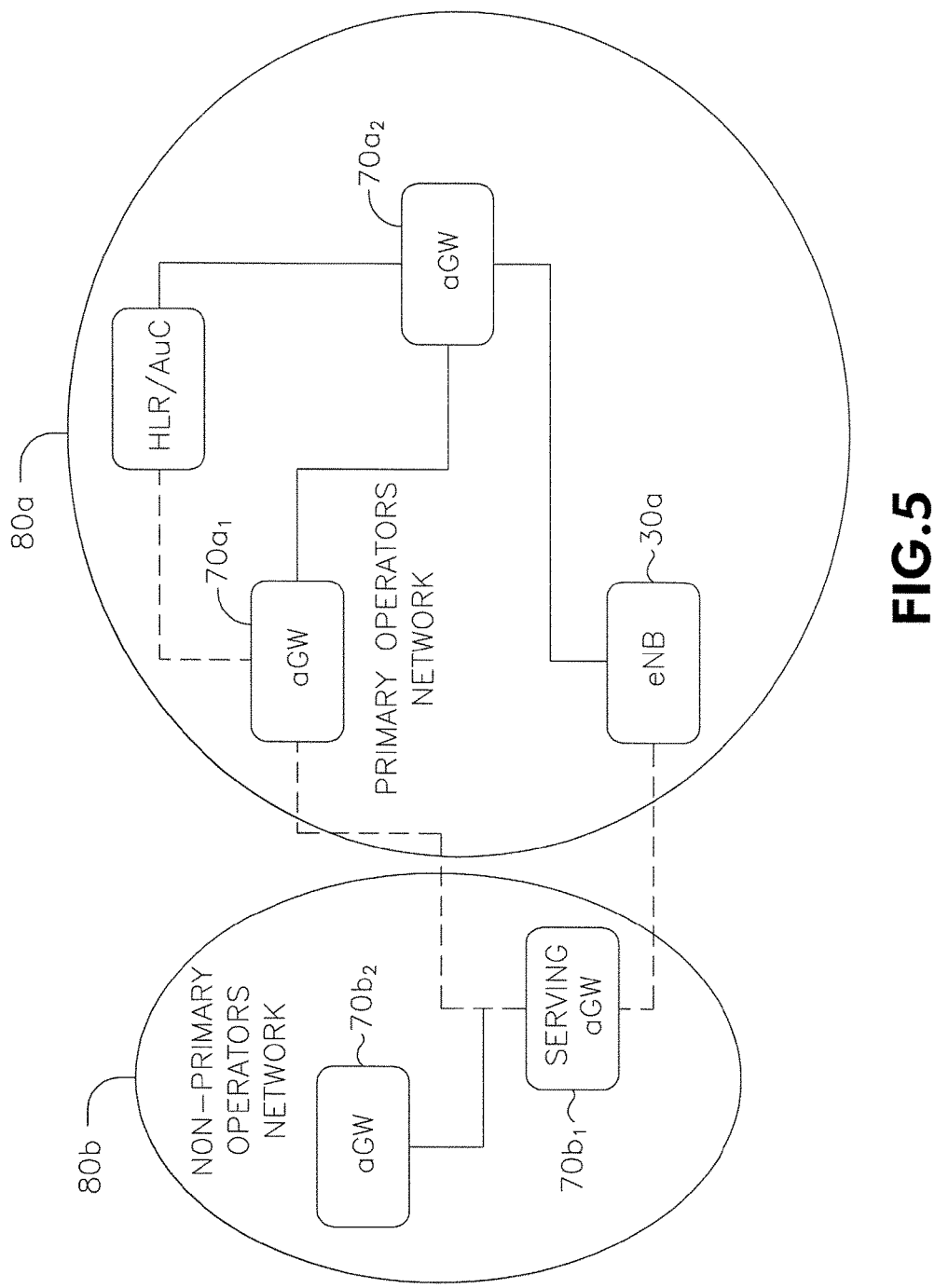
FIG. 5 is an example block diagram of a Serving aGW in a non-primary operator's network.

Alternatively, via pre-arrangement, an aGW $70b_1$, $70b_2$ in non-primary operator network 80b may also respond to the "Serving aGW Resolution Request" from eNB 30a with a positive response (i.e. serving–aGW=TRUE). If there is not an aGW in the primary operator's network 80a responding with a claim of being the serving aGW, then self configuring eNB 30a may take the response of non-primary operator aGWs $70b_1$, $70b_2$ seriously and consider responding aGW $70b_1$ or $70b_2$ as the serving aGW for pursuing all subsequently described actions. As illustrated in FIG. 5, in accordance with this alternative method, eNB 30 serving a GW 70$b_1$, would pursue authentication and E-UTRAN operating parameter acquisition, for example.

To LTE system 20, authentication of a new eNB 30a, or a restarting eNB, is a necessary network security procedure. As those having skill in the art know, security threats to an eNB are not as great as those to a WTRU generally for the following reasons:

- the wired configuration provides point to point communication, which is much more difficult to perform free listening, tracking, security key and ciphering break. Therefore, the challenge and response authentication protocol used for a WTRU authentication shall be sufficient for eNB authentication;
- unlike WTRUs, the geographical location of an eNB is generally fixed, and if it is detected as changed (except the first deploying moment or subsequent scheduled eNB relocation), it may be a sign of trouble (a security fraud usually is not committed at the same place in a visible open location of an eNB), a property that may be used as a security parameter; and
- since the S1 link 40 interface is protected by the underlying IPsec, no specific security keys/ciphering agreement are needed over the S1 link at the application protocol level, and as a result, no LTE specific security key agreement is needed during the eNB-network authentication.

Figure 6:
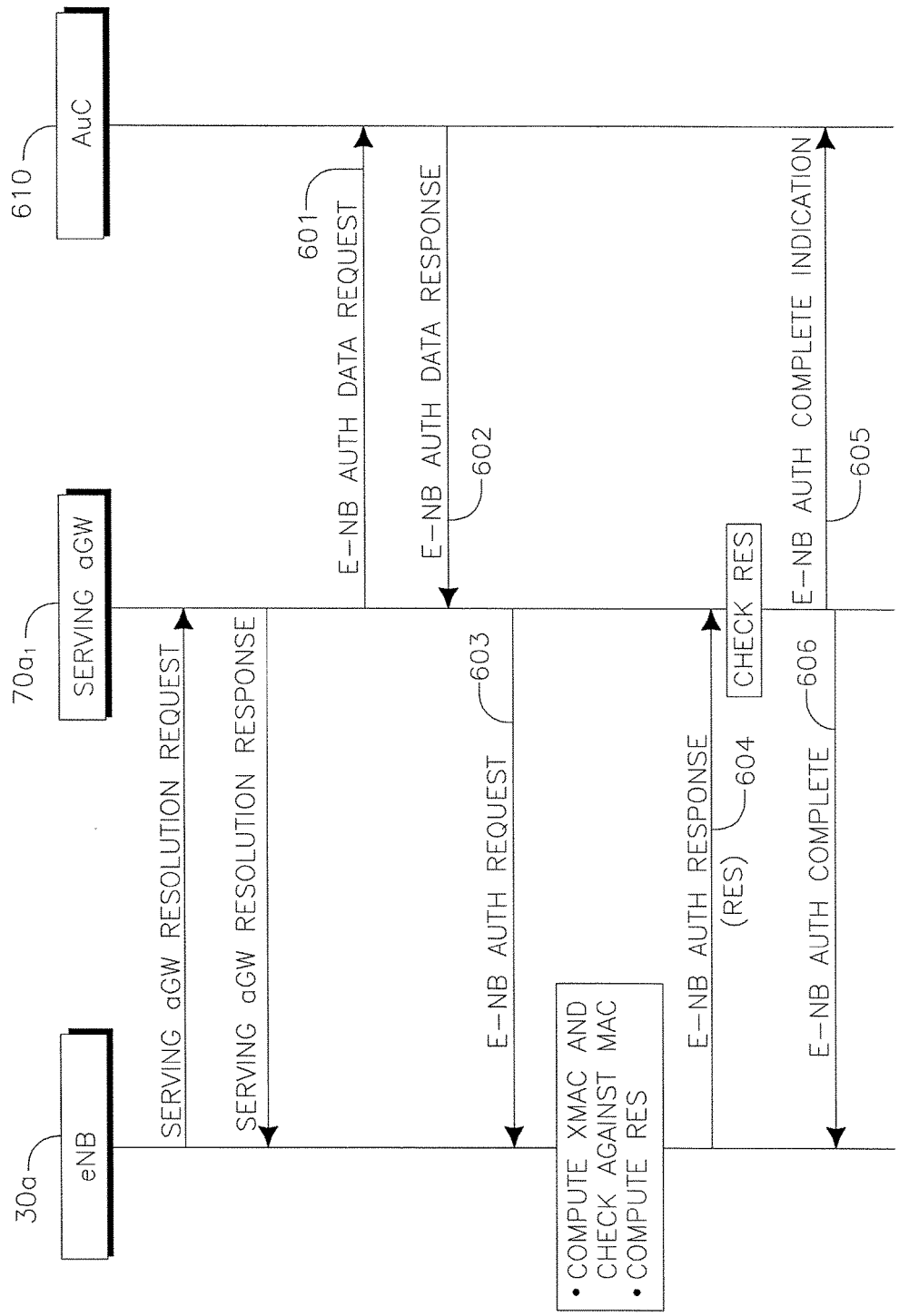
FIG. 6 is an example diagram for eNB authentication with an aGW and Authentication Center (AuC)

Given the above, a method for authenticating self configuring eNB 30a is disclosed. An example signal diagram of this disclosed method is illustrated in FIG. 6. AS disclosed above, eNB 30a establishes its service aGW through the sending of the serving aGW resolution request, which may include a Req_type, eNB-ID, PLMN-Id and/or a eNB-location-Id, and receiving from serving aGW 70$a_1$ a serving aGW resolution response. eNB authentication is then initiated from serving aGW 70$a_1$ at the triggering of any of the following:

- a new eNB self configuring or a eNB relocation start with a serving aGW request providing the eNB-location-Id (generated from the GPS on these two occasions); or
- a restarting eNB or a relocating eNB transmitting a Serving aGW Resolution request.

Serving aGW 70$a_1$ then sends an eNB Auth Data request 601 to the authentication center (AuC) 610 including eNB 30a identities, e.g., eNB-Id and eNB Location-Id. AuC 610 then generates the authentication parameters and sends them to serving aGW 70$a_1$, which are included in an E-NB Auth. Data Response signal 602. Serving aGW 70$a_1$ starts the authentication with self configuring eNB 30a by forwarding an E-NB Auth Request signal 603, which includes a Random number (RAND).

eNB 30a then computes an expected medium access control (MAC) (XMAC) and a Response (RES), checks the computed XMAC against a MAC, and sends the computed RES included in an E-NB Auth Response signal 604 to Serving aGW 70$a_1$. Serving aGW 70$a_1$ checks the RES and sends an authentication complete signal, e-NB Auth Complete 606, to eNB 30a and AuC 610 if RES is correct. Successful authentication completes with the authentication complete message. Authentication preferably fails if either one of the two checks fails, i.e., MAC or RES.

Figure 7:
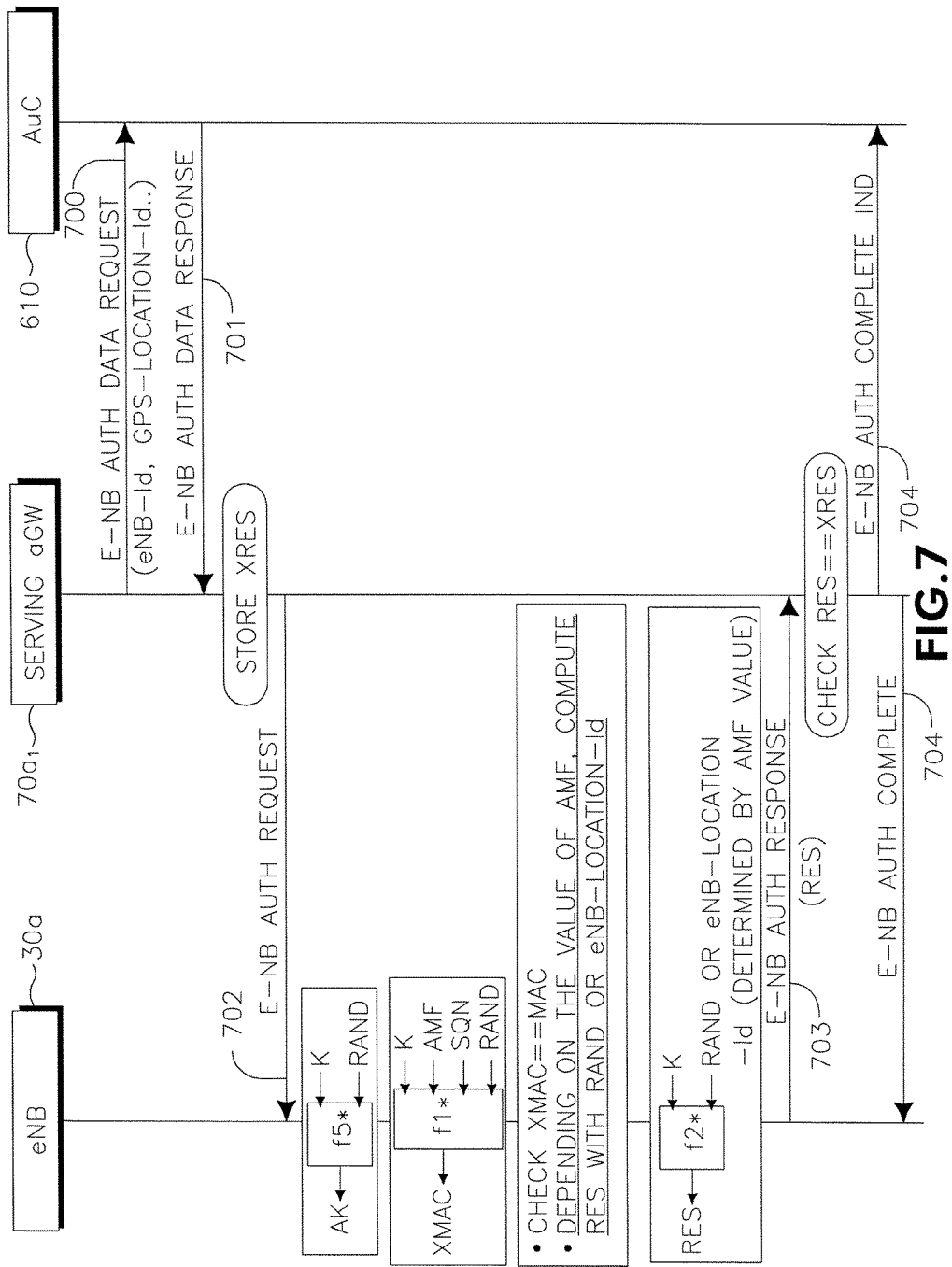
FIG. 7 is an example signal diagram for eNB-location-Id for calculating XRES/RES.

An alternative method of authenticating eNB 30a is disclosed, wherein an eNB location, preferably generated by a GPS location, may be included as a factor in the authentication calculation (RES against XRES) resulting in tighter network authentication against eNB 30a. FIG. 7 illustrates an example signal diagram of the disclosed authentication method using an eNB location Id.

Referring to FIG. 7, the disclosed method may be triggered by eNB 30a requesting to change its serving aGW, for example. Upon receipt of such a request, serving aGW 70$a_1$ forwards an E-NB Auth Data Request 700, which includes the eNB location-Id measured by eNB 30a and the eNB-ID, to AuC 610. AuC 610 then generates a sequence number (SQN) and a random number (RAND). An authentication management field (AMF) is then determined, and a MAC and RES encoded. In accordance with the teachings of this method, the XRES generated by AuC 610 via shared secret key K and the random number RAND running f2 algorithm, as known to those having skill in the art, may either be encoded by the RAND or by the normalized eNB-location-Id. The decision to use the RAND or eNB-location-Id is preferably dependant on the value of AMF, which is used to convey the authentication protocol information.

A trigger for employing the eNB-location-Id for XRES/RES may originate from serving aGW 70$a_1$ on special occasions, such as the serving aGW relocation, eNB initial deployment, restart or eNB relocation, or detection/report of unusual activities at the concerned eNB.

AuC 610 encodes the AMF for the XRES generation, using RAND, or using eNB-location-Id, in accordance with this method, and forwarded serving aGW 70$a_1$ in an eNB Auth Data Response 701. The AMF value, included in an E-NB Auth Request signal 702, is then sent to eNB 30a for decoding the XMAC as well as for determining whether to use RAND or use eNB-location-Id for computing the RES value. Employing the eNB-location-Id (which is not transferred at the authentication request to eNB) in the XRES computation makes an attempt to impersonate an eNB very difficult.

Referring to FIG. 7, it should noted that the f1*, f2* and f5* functional blocks indicate the current f1, f2 and f5 algorithm functions used in UMTS can still be used for the same purpose. Alternatively, other security algorithms with the same inputs and outputs can also be used to calculate the (X)MAC, (X)RES and AK.

Figure 8:
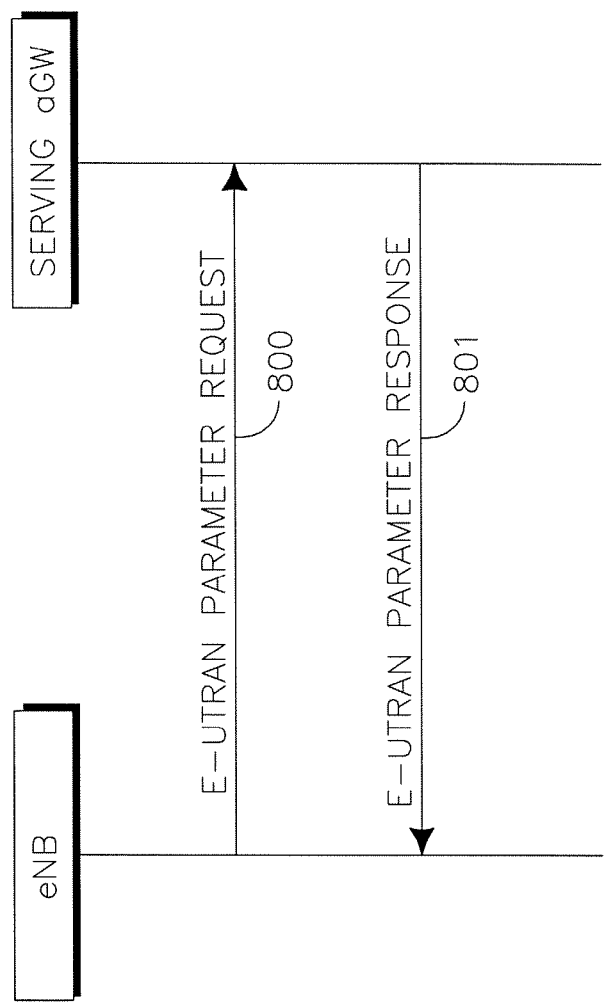
FIG. 8 is an example signal diagram for E-UTRAN Parameter Request.

The disclosed self configuring eNB 30 retrieves operating parameters for the E-UTRAN in order to attach to, interact, and operate with E-UTRAN elements, for example. Other network operators 80b (and their aGWs 70$b_1$, 70$b_2$). When self configuring eNB 30a has successfully authenticated with the primary operator's network 80a (when it receives the authentication complete message), eNB 30a may request the other network operator's 80b operating parameters from serving aGW 70$a_1$. These include parameters for operating with non-serving aGWs 70$b_1$, 70$b_2$ (MME and their UPEs) as well as various neighboring eNBs 30b, 30c LTE or non-LTE. FIG. 8 is an example signal diagram of a disclosed method for a self configuring eNB to retrieve the operating parameters.

Referring to FIG. 8, self configuring eNB 30a sends an E-UTRAN Parameter Request 800 to serving aGW 70$a_1$ including the identities of the respective EPC/aGW and the identities of the eNB-Ids, for whom the interacting policies, and operating parameters are requested. Serving aGW 70$a_1$ responds by sending an E-UTRAN Parameter Response signal 801 including the operating parameters for the respective aGWs and eNBs requested. Example categories of operating parameters may include the following:

For the primary operator aGWs:
  U-plane traffic handling parameters;
  CN-NAS specific information; and
  LCS and MBMS operation information;

For Non-primary operator's aGWs
  Policies towards the non-primary aGWs such as charging policy, security settings, handover policies and settings;
  U-plane traffic handling behaviors, routing priorities, throughput limit, handover behaviors; and
  CN-NAS specific information towards that specific PLMN;
Neighboring eNB/Cell Information
  Information on the association among networks (PLMN-Id), tracking area (TA-Id) and neighboring cells (Cell-Id);
  UE security parameters;
  Neighboring cells policies such as base stations could have handover with (LTE eNBs with X2 links and 2G/3G cells whose SGSN has a S3 connection with a connecting aGW), base stations could only do cell reselection with, and the like; and
  Cell operating frequency and cell bandwidth requirement, other RF related parameters, power parameters such as limits and thresholds, and the like.

Although the features and elements of the present invention are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method implemented by an evolved Node B (eNB), comprising:
  sending, from the eNB, a first message to establish a connection to a first node;
  sending, by the eNB to the first node, a further message for verification of the eNB using a location of the eNB;
  receiving by the eNB from the first node after verification, a second message including parameters associated with a second node to establish a connection with the second node;
  establishing, by the eNB, the connection with the second node using the parameters included in the second message; and
  acquiring, by the eNB from the second node, one or more operating parameters; to auto-configure the eNB for communication with one or more network entities.

2. The method of claim 1, further comprising auto-configuring, using the acquired one or more operating parameters, the eNB for communication with the one or more network entities.

3. The method of claim 2, wherein the auto-configuring of the eNB includes configuring, without user intervention based on the acquired one or more operating parameters, the eNB to use IPsec protocol to securely communicate with the one or more network entities.

4. The method of claim 1, wherein the sending of the further message includes sending information regarding the eNB including an eNB identifier and location information of the eNB.

5. The method of claim 4, wherein the location information of the eNB includes latitude information and longitude information associated with the eNB.

6. The method of claim 4, wherein the eNB identifier and the location information are used to perform identity and location verification of the eNB.

7. The method of claim 1, wherein:
  the sending of the further message includes sending location information of the eNB, and
  the receiving of the second message is conditioned on a location of the eNB being verified based on the location information in the further message.

8. The method of claim 1, further comprising:
  handing over, by the eNB to a neighboring eNB, a WRTU using the acquired operating parameters associated with one or more neighboring cells that was acquired via the connection with the second node.

9. The method of claim 1, wherein the acquired operating parameters include any of: (1) routing priority information; (2) IPsec security information; (3) tracking area information, (4) cell operating frequency information; (5) cell bandwidth information; (6) cell identifier information; (7) PLMN identifier information; or (8) power control information.

10. An evolved Node B (eNB) comprising:
  a transmit/receive unit including circuitry and configured to:
    send a first message to establish a connection to a first node,
    send a further message to the first node for verification of the eNB using a location of the eNB, and
    receive, from the first node after verification, a second message including parameters associated with a second node to establish a connection with the second node; and
  a processor including circuitry, in communication with the transmit/receiver unit, and configured to establish a connection with the second node using the parameters included in the second message,
  wherein the transmit/receive unit is configured to acquire, from the second node, one or more operating parameters to auto-configure the eNB for communication with one or more network entities.

11. The eNB of claim 10, wherein the processor is configured to auto-configure, using the acquired one or more operating parameters, the eNB for communication with the one or more network entities.

12. The eNB of claim 10, wherein the processor is configured, without user intervention based on the acquired one or more operating parameters, to use IP sec protocol to securely communicate with the one or more network entities.

13. The eNB of claim 10, wherein the transmit/receive unit is configured to
send information regarding the eNB including an eNB identifier and location information of the eNB.

14. The eNB of claim 13, wherein the location information of the eNB includes latitude information and longitude information associated with the eNB.

15. The eNB of claim 13, wherein the eNB identifier and the location information are used to perform identity and location verification of the eNB.

16. The eNB of claim 10, wherein the transmit/receive unit is configured to:

send the further message including location information of the eNB; and receive the second message on condition that a location of the eNB is verified based on the location information in the further message.

17. The eNB of claim 10, wherein the processor is configured to perform a handover to handover a WTRU to a neighboring eNB based on the acquired operating parameters that are associated with a neighboring cell of the neighboring eNB.

18. The eNB of claim 10, wherein the acquired operating parameters include any of: (1) routing priority information; (2) IPsec security information; (3) tracking area information, (4) cell operating frequency information; (5) cell bandwidth information; (6) cell identifier information; (7) PLMN identifier information; or (8) power control information.

* * * * *

UNITED STATES PATENT AND TRADEMARK OFFICE
CERTIFICATE OF CORRECTION

PATENT NO. : 9,854,497 B2
APPLICATION NO. : 15/429959
DATED : December 26, 2017
INVENTOR(S) : James M. Miller, Ulises Olvera-Hernandez and Peter Wang Page 1 of 1

It is certified that error appears in the above-identified patent and that said Letters Patent is hereby corrected as shown below:

In the Specification

In Column 2, Line 29, change "30c." to --30c).--.

Signed and Sealed this
Eighth Day of January, 2019

Andrei Iancu
*Director of the United States Patent and Trademark Office*